US011292495B2

(12) United States Patent
Brückler et al.

(10) Patent No.: US 11,292,495 B2
(45) Date of Patent: Apr. 5, 2022

(54) SOLE BAR ARRANGEMENT FOR A BODY OF A VEHICLE

(71) Applicant: SIEMENS MOBILITY GMBH, Vienna (AT)

(72) Inventors: Ewald Brückler, Graz (AT); Rupert Eckhart, Fernitz (AT); Roman Groszschädl, Fernitz (AT); Johannes Windhager, Södingberg (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 336 days.

(21) Appl. No.: 16/345,372

(22) PCT Filed: Oct. 24, 2017

(86) PCT No.: PCT/EP2017/077135
§ 371 (c)(1),
(2) Date: Apr. 26, 2019

(87) PCT Pub. No.: WO2018/077861
PCT Pub. Date: May 3, 2018

(65) Prior Publication Data
US 2019/0263431 A1 Aug. 29, 2019

(30) Foreign Application Priority Data

Oct. 27, 2016 (AT) .............. A 50983/2016

(51) Int. Cl.
*B61F 5/52* (2006.01)
*B61F 1/14* (2006.01)
(Continued)

(52) U.S. Cl.
CPC ............... *B61F 5/52* (2013.01); *B61F 1/08* (2013.01); *B61F 1/14* (2013.01); *B61F 5/02* (2013.01);
(Continued)

(58) Field of Classification Search
CPC ...... B61F 5/02; B61F 5/52; B61F 1/08; B61F 1/14; F16B 5/02; F16B 5/0614; F16B 19/02
See application file for complete search history.

(56) References Cited

U.S. PATENT DOCUMENTS 6,688,237 B2 * 2/2004 Back ................. B61D 15/06
105/392.5
6,871,903 B2 * 3/2005 Taguchi ............. B61D 17/08
105/396

(Continued)

FOREIGN PATENT DOCUMENTS

CN 1572559 2/2005
CN 2926005 Y 7/2007
(Continued)

*Primary Examiner* — Jason C Smith
(74) *Attorney, Agent, or Firm* — Cozen O'Connor

(57) ABSTRACT

A sole bar arrangement for a body of a vehicle, in particular a rail vehicle includes at least one sole bar that has a hole pattern and at least one suspension device, perforated in an interface-identical manner to the hole pattern and has a U-shaped cross-section, wherein the at least one suspension device is interlockingly and frictionally connected to the at least one sole bar, where the interface-identical configuration of the sole beam and the suspension device results in great flexibility with respect to the type and number of devices to be coupled to the body via the suspension device so as to create advantageous design conditions such that the production process of the body is simplified and accelerated.

10 Claims, 3 Drawing Sheets

(51) Int. Cl.
  *B61F 5/02* (2006.01)
  *B61F 1/08* (2006.01)
  *F16B 5/06* (2006.01)
  *F16B 19/02* (2006.01)
  *F16B 5/02* (2006.01)

(52) U.S. Cl.
  CPC .............. *F16B 5/02* (2013.01); *F16B 5/0614* (2013.01); *F16B 19/02* (2013.01)

(56) References Cited

U.S. PATENT DOCUMENTS

| | | | |
|---|---|---|---|
| 10,549,764 B2 * | 2/2020 | Hirashima | B61C 17/00 |
| 2003/0019390 A1 * | 1/2003 | Back | B61D 15/06 |
| | | | 105/410 |
| 2015/0020709 A1 * | 1/2015 | Hayashi | B61F 1/08 |
| | | | 105/413 |
| 2018/0037238 A1 * | 2/2018 | Hirashima | B61D 17/10 |
| 2019/0263431 A1 * | 8/2019 | Bruckler | B61F 5/52 |

FOREIGN PATENT DOCUMENTS

| | | |
|---|---|---|
| CN | 101670855 | 3/2010 |
| CN | 202593539 U | 12/2012 |
| CN | 202657031 U | 1/2013 |
| CN | 204728543 U | 10/2015 |
| DE | 3309736 | 9/1984 |
| DE | 3823418 | 1/1990 |
| DE | 29614089 | 11/1996 |
| EP | 1340662 | 9/2003 |
| JP | 39-057703 B2 | 8/2007 |
| WO | WO2016/135782 | 7/2017 |

* cited by examiner

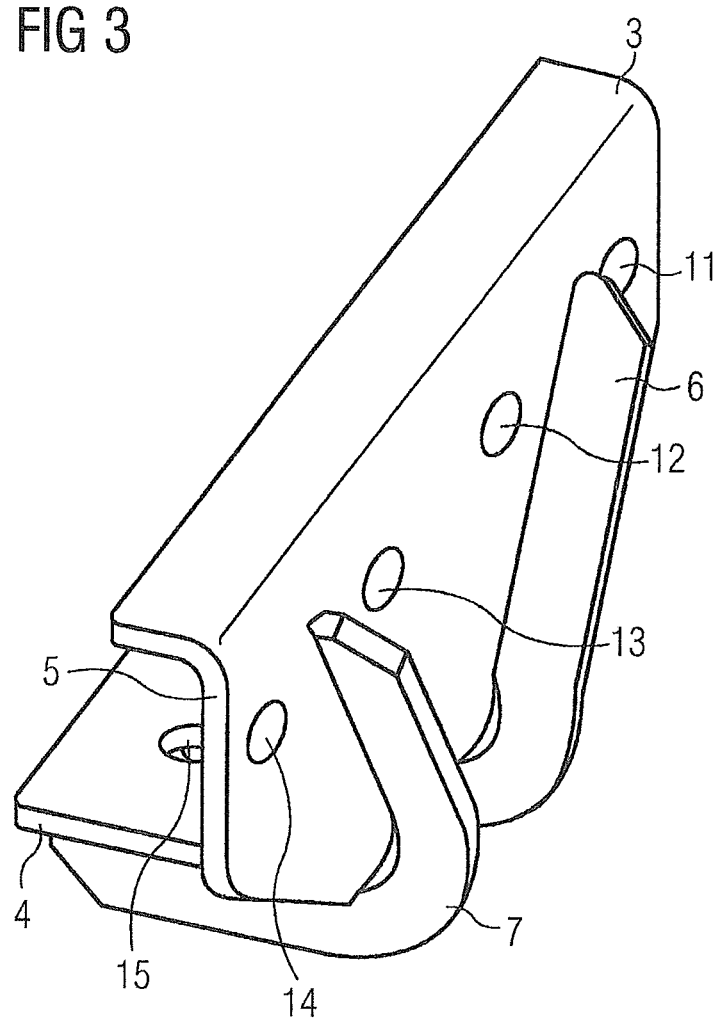

SOLE BAR ARRANGEMENT FOR A BODY OF A VEHICLE

CROSS-REFERENCE TO RELATED APPLICATIONS

This is a U.S. national stage of application No. PCT/EP2017/077135 filed Oct. 24, 2017. Priority is claimed on AT Application No. A50983/2016 filed Oct. 27, 2016, the content of which is incorporated herein by reference in its entirety.

BACKGROUND OF THE INVENTION

1. Field of the Invention

The invention relates to a sole bar arrangement for a body of a vehicle, in particular a rail vehicle.

2. Description of the Related Art

Devices, such as air conditioning systems, human-waste containers, batteries or compressed air modules, are frequently arranged under the body of a vehicle, in particular a rail vehicle, i.e., in an underfloor position.

They are coupled to suspension devices that are welded to sole bars.

EP 1 752 250 B1 describes a laser welding method and also welded connections to outer plates and structural parts of bodies for rail vehicles. Suspension devices which are interlockingly and frictionally connected to the body by way of a sole bar for the purpose of coupling devices to the body are not disclosed.

Furthermore, DE 10 2014 113 829 A1 discloses a modular fixing system for connecting underfloor components to bodies of rail vehicles by way of fixing elements. The interfaces between the fixing elements and the body are not disclosed in detail. A combined interlocking and frictional connection between the fixing elements and the body is not described. Furthermore, no sole bar with a hole pattern for coupling the underfloor components to the sole bar is disclosed.

SUMMARY OF THE INVENTION

In view of the foregoing, it is therefore an object of the invention to provide an improved sole bar arrangement in comparison to the state of the art.

This and other objects and advantages are achieved in accordance with the invention by a sole bar arrangement in which at least one sole bar has a hole pattern and at least one suspension device perforated in an interface-identical manner to the hole pattern, and has a U-shaped cross-section, where the at least one suspension device is interlockingly and frictionally connected to the at least one sole bar.

The interface-identical configuration of the sole bar and the suspension device results in great flexibility with respect to the type and number of devices to be coupled to the body via the suspension device. The interfaces (e.g., hole layouts) merely need to be matched to each other between the suspension devices and the devices. The sole bar and its hole pattern remain unchanged even in the event of a change in the underfloor configuration of an existing vehicle with devices. Furthermore body platforms with different underfloor configurations can be offered.

Moreover, the production process of the body is simplified and accelerated because no welded connections but instead interlocking and frictional connections are provided between the sole bar and the suspension devices. No jig frames are required, such as would have to be provided in the event of welding operations for positioning suspension devices with reference to the sole bar. This results in a cost advantage being achieved in terms of work preparation and production.

Moreover, due to the elimination of welded connections, no harmful thermal deformations (welding distortion) are created in the sole bar. As a result, a cold hardening of the sole bar performed in the course of the production process is maintained even after the installation of suspension devices on the sole bar.

It is favorable if the interlocking connection between the at least one suspension device and the at least one sole bar is provided at least in the direction of a vertical axis. For example, vertical alignment of the vertical axis and implementation of the suspension device in the form of a hook that is seated on an L-shaped region of the sole bar produces the advantage of redundancy of the interlocking connection with respect to the frictional connection in the following manner: if the frictional connection fails, then the suspension device is still held on the sole bar due to the interlocking connection.

In an advantageous embodiment, the at least one suspension device has at least a first stiffening rib.

These measures result in the principle of a lightweight construction being established and a weight reduction being achieved for the suspension device.

A favorable solution is produced if the at least one device is interlockingly and frictionally connected to the at least one suspension device at least in the direction of a second longitudinal axis. The measure of an interlocking and frictional connection between the device and the suspension device results in the advantage of redundancy being achieved. If the frictional connection fails the device is still held on the suspension device due to the interlocking connection.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in detail below based on exemplary embodiments, in which:

FIG. 3 shows an oblique view of a suspension device of an inventive sole bar arrangement.

DETAILED DESCRIPTION OF THE EXEMPLARY EMBODIMENTS

Figure 1:
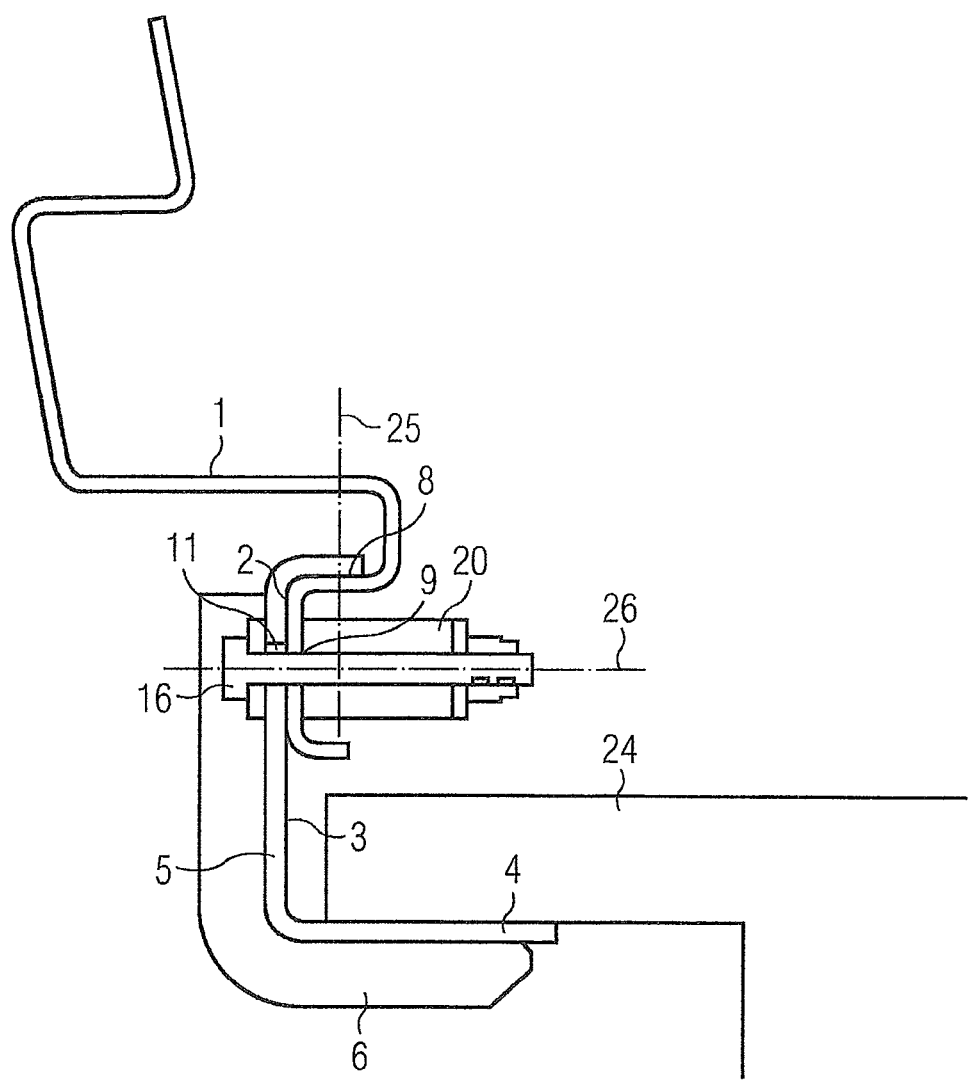
FIG. 1 shows a side view of an inventive sole bar arrangement with a sole bar, a suspension device, and also a device connected to the suspension device.

FIG. 1 shows an exemplary embodiment of an inventive sole bar arrangement in a side view. A sole bar 1 is connected to a side wall (not shown) of a body of a rail vehicle. On an inner side of the body the sole bar 1 is fastened on supports of the side wall and on an outer side welded to the side wall. The sole bar 1 is implemented in steel; in cross-section its geometry has an approximately double S-shape with straight and also rounded sections arranged at right-angles and obliquely with respect to each other. In accordance with the invention, it is also possible for the sole bar to be implemented in aluminum.

Figure 2:
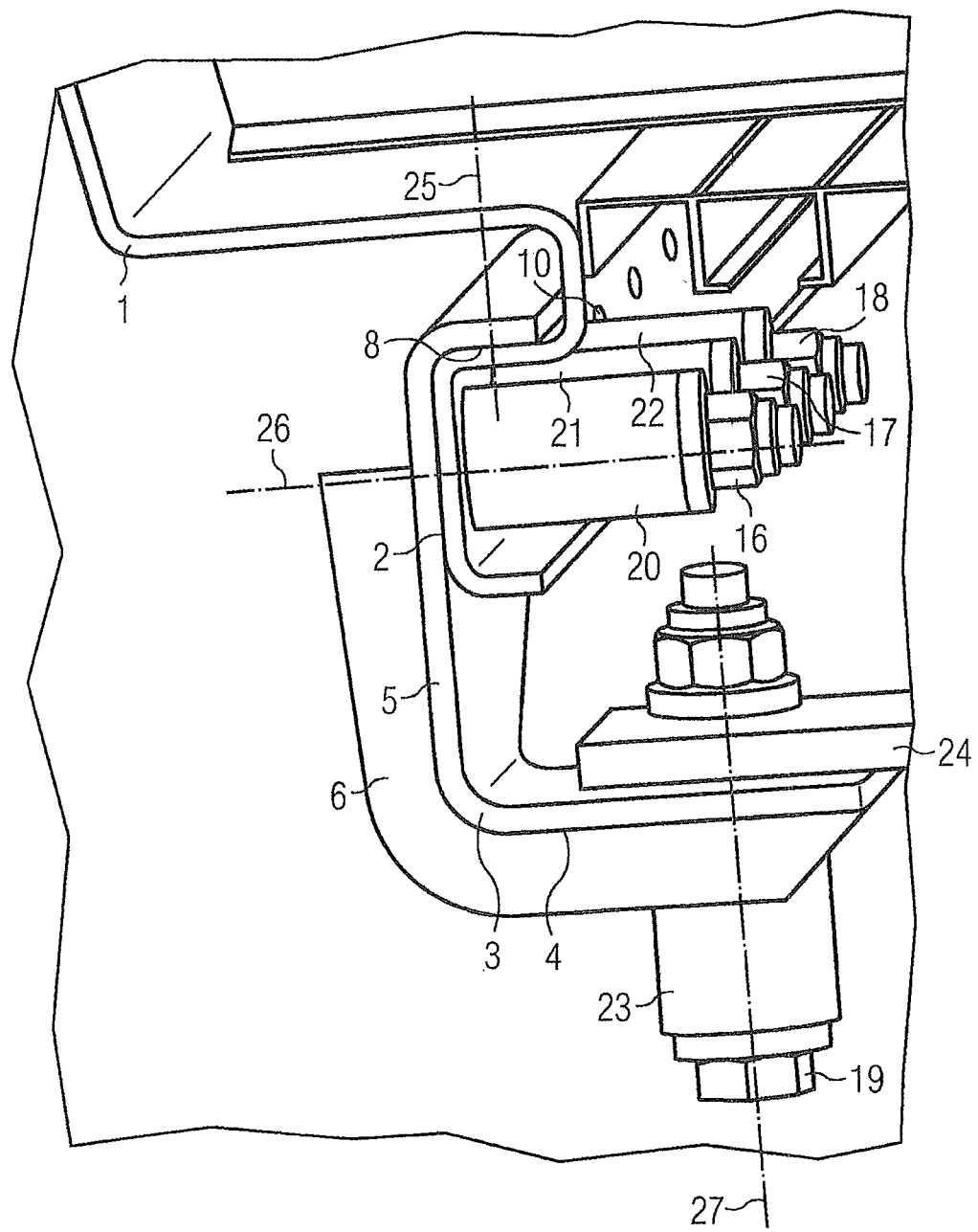
FIG. 2 shows an oblique view of an inventive sole bar arrangement with a sole bar, a suspension device, and also a device connected to the suspension device.

A hole pattern is arranged on the sole bar with a first hole 9 and also, shown in FIG. 2, a second hole 10, and further holes which are punched out along a straight line on a side surface 2 of the sole bar 1. In accordance with the invention it is also possible for the holes to be produced by using a laser. Furthermore, it is also conceivable to arrange slots in place of holes.

Connected interlockingly and frictionally to the sole bar 1 is a suspension device 3, which is implemented in steel and which has a U-shaped cross-section with straight and also rounded sections. The suspension device 3 rests on the sole bar 1 in the region of a contact surface 8. In that region, the suspension device 3 and the sole bar 1 are implemented in a hook-shape or L-shape, respectively. As a result, the suspension device 3 is held on the sole bar 1 in the direction of a vertical axis 25, or respectively it is rendered more difficult for the suspension device 3 to detach itself from the sole bar 1.

Furthermore, the suspension device 3 is bolted to the sole bar 1. A first hexagon head bolt 16 is placed through the first hole 9 of the sole bar 1 and also through a third hole 11 in a side plate 5 of the suspension device 3, arranged about a first longitudinal axis 26, and aligned along the same. The first longitudinal axis 26 is aligned perpendicularly to the vertical axis 25. A first sleeve 20 is arranged between a bolt head and a locking nut. Further bolt connections of the same type, shown in FIG. 2, which are aligned along parallels to the first longitudinal axis 26, are arranged in further holes in the hole pattern of the sole bar 1 and the suspension device 3.

A first stiffening rib 6 and a second stiffening rib 7, visible in FIG. 3, are welded to the suspension device 3. The first stiffening rib 6 lies against a base plate 4 and also against the side plate 5 of the suspension device 3.

Resting on the base plate 4 of the suspension device 3 is a device 24 implemented in the form of an air conditioning system, which is connected to the base plate 4 by way of a fourth hexagon head bolt 19 shown in FIG. 2. The device 24 is consequently secured in a redundant manner against detachment from the suspension device 3. In the case of the device 24 being implemented in the form of an air conditioning unit, this is a favorable solution. However, it is also conceivable in accordance with the invention to realize the device 24 in the form of a compressed air module, etc.

FIG. 2 shows an oblique view of an exemplary embodiment of an inventive sole bar arrangement.

The principles associated with the illustrated embodiment correspond to that shown in FIG. 1. Consequently, the same reference symbols are used in FIG. 2 as in FIG. 1.

A suspension device 3 is connected to a sole bar 1 via a first hexagon head bolt 16 and a first sleeve 20, a second hexagon head bolt 17 and a second sleeve 21, and also a third hexagon head bolt 18 and a third sleeve 22.

The suspension device 3 rests via a contact surface 8 on the sole bar 1 and is held on the same due to the cross-sectional geometry of the suspension device 3 and the sole bar 1 in the region of the contact surface 8 in the direction of a vertical axis 25.

A device 24 is coupled to a base plate 4 of the suspension device 3 via a fourth hexagon head bolt 19.

The fourth hexagon head bolt 19 is arranged about a second longitudinal axis 27 and aligned along the same. A fourth sleeve 23 is arranged between a bolt head and a locking nut. The second longitudinal axis 27 is arranged parallel to the vertical axis 25.

The bolt connections between the suspension device 3 and the sole bar 1 and also the device 24 are implemented in the form of dynamic bolt connections under the rules of the Association of German Engineers (VDI) 2230. Their grip lengths are at least three to five times as large as the bolt diameters.

FIG. 3 shows an oblique view of a suspension device 3 of an inventive sole bar arrangement. The principles associated with the illustrated embodiment correspond to that shown in FIG. 1 and FIG. 2. Consequently, the same reference symbols are used in FIG. 3 as in FIG. 1 and FIG. 2.

The suspension device 3 has a U-shaped contour. A third hole 11, a fourth hole 12, a fifth hole 13, and also a sixth hole 14, via which the suspension device 3 is bolted to a sole bar 1 shown in FIG. 1 and FIG. 2, are arranged on a side plate 5. The holes are punched and arranged along a straight line. This hole layout is coincident with a hole pattern on the sole bar 1, as shown in FIG. 2.

A seventh hole 15 and also further holes that are not visible are arranged on a base plate 4 of the suspension device 3. A device 24 shown in FIG. 1 and FIG. 2 is bolted to the suspension device 3 by way of said holes.

A first stiffening rib 6 and a second stiffening rib 7 are welded to the suspension device 3. The first stiffening rib 6 and the second stiffening rib 7 lie against the base plate 4 and also against the side plate 5.

Thus. while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A sole bar arrangement for a body of a vehicle, comprising:
   at least one double-S shaped sole bar having a U-shaped cross-section, a hole pattern and having at least one suspension device perforated in an interface-identical manner to the hole pattern, said at least one suspension device having a U-shaped contour;
   wherein said at least one suspension device is interlockingly and frictionally connected to said at least one double-S shaped sole bar and rests on said at least one double-S shaped sole bar in a region of a contact surface.

2. The sole bar arrangement as claimed in claim 1, wherein said interlocking connection between said at least one suspension device and said at least one double-S shaped sole bar is at least in a direction of a vertical axis.

3. The sole bar arrangement as claimed in claim 2, wherein said at least one suspension device and said at least one double-S shaped sole bar are formed in an L-shape in a region of the contact surface between said at least one suspension device and said at least one double-S shaped sole bar.

4. The sole bar arrangement as claimed in claim 3, wherein said frictional connection between said at least one suspension device and said at least one double-S shaped sole bar is at least in a direction of a first longitudinal axis.

5. The sole bar arrangement as claimed in claim 2, wherein the frictional connection between said at least one suspension device and said at least one double-S shaped sole bar is at least in a direction of a first longitudinal axis.

6. The sole bar arrangement as claimed in claim 1, wherein the frictional connection between said at least one suspension device and said at least one double-S shaped sole bar is at least in a direction of a first longitudinal axis.

7. The sole bar arrangement as claimed in claim 1, wherein said at least one suspension device includes at least a first stiffening rib.

8. The sole bar arrangement as claimed in claim 1, wherein at least one device is interlockingly and frictionally connected to said at least one suspension device at least in a direction of a second longitudinal axis.

9. The sole bar arrangement as claimed in claim 8, wherein said at least one device rests on said at least one suspension device.

10. The sole bar arrangement as claimed in claim 1, wherein the vehicle comprises a rail vehicle.

* * * * *